United States Patent
Barak et al.

(10) Patent No.: US 9,300,671 B1
(45) Date of Patent: Mar. 29, 2016

(54) SHARED ACCESS WITH ACCOUNT RESTRICTION AND PROMOTION UTILIZING VIRTUAL ACCOUNTS

(71) Applicant: CA, Inc., Islandia, NY (US)

(72) Inventors: Nir Barak, Karmi Yosef (IL); Amir Jerbi, Givatayim (IL); Laurent Lankri, Netanya (IL)

(73) Assignee: CA, Inc., New York, NY (US)

( * ) Notice: Subject to any disclaimer, the term of this patent is extended or adjusted under 35 U.S.C. 154(b) by 1 day.

(21) Appl. No.: 14/143,403

(22) Filed: Dec. 30, 2013

(51) Int. Cl.
*H04L 29/06* (2006.01)
*G06F 21/60* (2013.01)

(52) U.S. Cl.
CPC ............... *H04L 63/10* (2013.01); *H04L 63/08* (2013.01); *H04L 63/083* (2013.01); *G06F 21/604* (2013.01)

(58) Field of Classification Search
CPC ... G06F 21/6245; G06F 3/0637; G06F 21/44; H04L 67/30; H04L 63/10
USPC .......................................................... 726/4
See application file for complete search history.

(56) References Cited

U.S. PATENT DOCUMENTS

| | | | |
|---|---|---|---|
| 6,434,700 B1 * | 8/2002 | Alonso et al. ................. | 713/169 |
| 7,941,669 B2 * | 5/2011 | Foley .................... | H04L 63/083 713/182 |
| 8,224,873 B1 * | 7/2012 | Korablev ............ | G06F 21/6218 707/809 |
| 8,224,974 B1 * | 7/2012 | Flora et al. .................... | 709/228 |
| 8,312,519 B1 * | 11/2012 | Bailey et al. ....................... | 726/6 |
| 8,510,818 B2 * | 8/2013 | Garg ................... | H04L 63/0815 713/182 |
| 8,869,244 B1 * | 10/2014 | Sundaram ........... | G06F 21/6218 726/4 |
| 8,875,242 B2 * | 10/2014 | Choi ................... | H04L 63/0815 713/152 |
| 2002/0188709 A1 * | 12/2002 | McGraw et al. .............. | 709/223 |
| 2003/0204754 A1 * | 10/2003 | Cromer .................. | G06F 21/80 726/17 |
| 2004/0003279 A1 * | 1/2004 | Beilinson et al. ............. | 713/200 |
| 2006/0070114 A1 * | 3/2006 | Wood et al. ........................ | 726/2 |
| 2006/0200679 A1 * | 9/2006 | Hawk ..................... | G06F 21/31 713/183 |
| 2007/0050369 A1 * | 3/2007 | Stiegler ................... | G06F 21/53 |
| 2008/0320588 A1 * | 12/2008 | Lipetz ............... | 726/19 |
| 2009/0049174 A1 * | 2/2009 | Rudnik ......................... | 709/226 |
| 2010/0122327 A1 * | 5/2010 | Linecker ................. | H04L 63/08 726/6 |
| 2012/0054744 A1 * | 3/2012 | Singh et al. ....................... | 718/1 |

OTHER PUBLICATIONS

Switch users without logging off—Windows Help [online]. Microsoft Corporation [retrieved on May 18, 2015]. Retrieved from the Internet: <URL: windows.microsoft.com/en-us/windows/switch-users-without-logging-off>, 2 pages.

* cited by examiner

*Primary Examiner* — Izunna Okeke
*Assistant Examiner* — Bryan Wright
(74) *Attorney, Agent, or Firm* — Myers Bigel & Sibley, P.A.

(57) ABSTRACT

A restricted account may be created responsive to a successful login by a user for a shared account. The restricted account may have fewer access privileges to resources of the computer system than the shared account. The user may have access to the operating system through the restricted account rather than the shared account. The user is prompted for higher authentication information responsive to a request by the user to promote the restricted account to a higher authentication account during the session. The restricted account is promoted to the higher authentication account during the session. The higher authentication account has greater access privileges to resources of the computer system than the restricted account.

21 Claims, 5 Drawing Sheets

SHARED ACCESS WITH ACCOUNT RESTRICTION AND PROMOTION UTILIZING VIRTUAL ACCOUNTS

TECHNICAL FIELD

The present disclosure relates generally to computer networks, software applications and virtual computing environments.

BACKGROUND

Users may log into virtual machines (VMs) in a computer system, including in a cloud computing system. When a VM is ordered from a public cloud provider, it is usually setup with a single account (e.g., "root") that has access to the VM. Users that would like to access this VM would usually receive the shared account credentials (usually a secure shell key, or SSH key) from the cloud provider and use it to log into the VM. This approach introduces some security risks due to insufficient control of the shared credentials and a lack of accountability.

If local user accounts are created for each user to increase accountability, management of the local user accounts can become burdensome. The local user accounts need to be created and maintained, and mechanisms need to be put in place for password authentication and management. This may be unreasonably burdensome for many of the actions users may regularly perform.

Other solutions may involve logging into a general server and requesting root privileges or using a password vault. The password vault system rotates the shared account credentials based on time and usage. In order to log into the VM, a user would first need to retrieve the VM credentials from the password vault. This adds accountability and control to the process. However, the limitation with such solutions is that it requires the user to change their regular work processes. Instead of directly accessing the target VM, they need to pass through the password vault in order to retrieve extra credentials. In addition, the need to go through the password vault may not be related to the type of work that the user would like to perform on the VM. Also, the credentials to the system may have to be changed frequently because the identity may be based on the fact that only one user at a time knows the vault password.

BRIEF SUMMARY

Embodiments of the disclosure describe methods and systems for logging into a computer system with a shared account that may have restricted access privileges. The restricted account may be promoted to a higher authentication account, such as a corporate user account, to perform additional actions in the computer system during the session that would have otherwise been prohibited, but only when desired or necessary.

According to some embodiments, a method may include creating a restricted account having fewer access privileges to resources of the computer system during a session than a shared account on an operating system of a computer system. This creation may be responsive to a successful login by a user for the shared account. The shared account may have administrative or root privileges during the session, such as read, write, modify and execute file access privileges. The user may then have access to the operating system through the restricted account rather than the shared account. The method may also include prompting the user for higher authentication information responsive to a request by the user to promote the restricted account to a higher authentication account during the session. The higher authentication information may be unique to the user. The method may further include promoting the restricted account to the higher authentication account during the session responsive to a successful validation of the higher authentication information. The higher authentication account may have greater access privileges to resources of the computer system than the restricted account, including read, execute, write and modify file access privileges.

In some embodiments, an identity of the session may be changed in a session identity store from the shared account to the restricted account. This may be performed without changing an identity or policy of the shared account on the operating system, or logging out of the shared account on the operating system for the session. In some embodiments, the restricted account may be a virtual account.

In some embodiments, promoting the restricted account to the higher authentication account may include changing an identity of the session in the session identity store from the restricted account to the higher authentication account.

In some embodiments, a system may include a processor and a memory coupled to the processor and comprising computer readable program code embodied in the memory that when executed by the processor causes the processor to perform operations. The operations may include, responsive to a successful login by a user for a shared account during a session on an operating system of a computer system, creating a restricted account having fewer access privileges to resources of the computer system during the session than the shared account. The operation may also include, responsive to a request by the user to promote the restricted account to a higher authentication account during the session, prompting the user for higher authentication information. The operations may further include, responsive to a successful validation of the higher authentication information, promoting the restricted account to the higher authentication account during the session. The higher authentication account may have greater access privileges to resources of the computer system than the restricted account.

In some embodiments, a computer program product may include a tangible and/or non-transitory computer readable storage medium having computer readable program code embodied in the medium that when executed by a processor causes the processor to perform operations. The operations may include, responsive to a successful login by a user for a shared account during a session on an operating system of a computer system, creating a restricted account having less access privileges to resources of the computer system during the session than the shared account. The operations may also include, responsive to a request by the user to promote the restricted account to a higher authentication account during the session, prompting the user for higher authentication information. The operations may further include, responsive to a successful validation of the higher authentication information, promoting the restricted account to the higher authentication account during the session. The higher authentication account may have greater access privileges to resources of the computer system than the restricted account.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Embodiments of the present disclosure are illustrated by way of example and are not limited by the accompanying figures with like references indicating like elements.

DETAILED DESCRIPTION

Embodiments of the present disclosure will be described more fully hereinafter with reference to the accompanying drawings. Other embodiments may take many different forms and should not be construed as limited to the embodiments set forth herein.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Logging into a computer system can involve a lack of accountability, require changing credentials or add unnecessary login mechanisms. Embodiments described herein may allow a user to login with credentials that may not need to change on every login. The account may have restricted access privileges. However, once the user wants to perform a more sensitive operation or work with more sensitive data that would be prohibited for the restricted account, a higher or stronger authentication login may then be performed to receive expanded access privileges.

Figure 1:
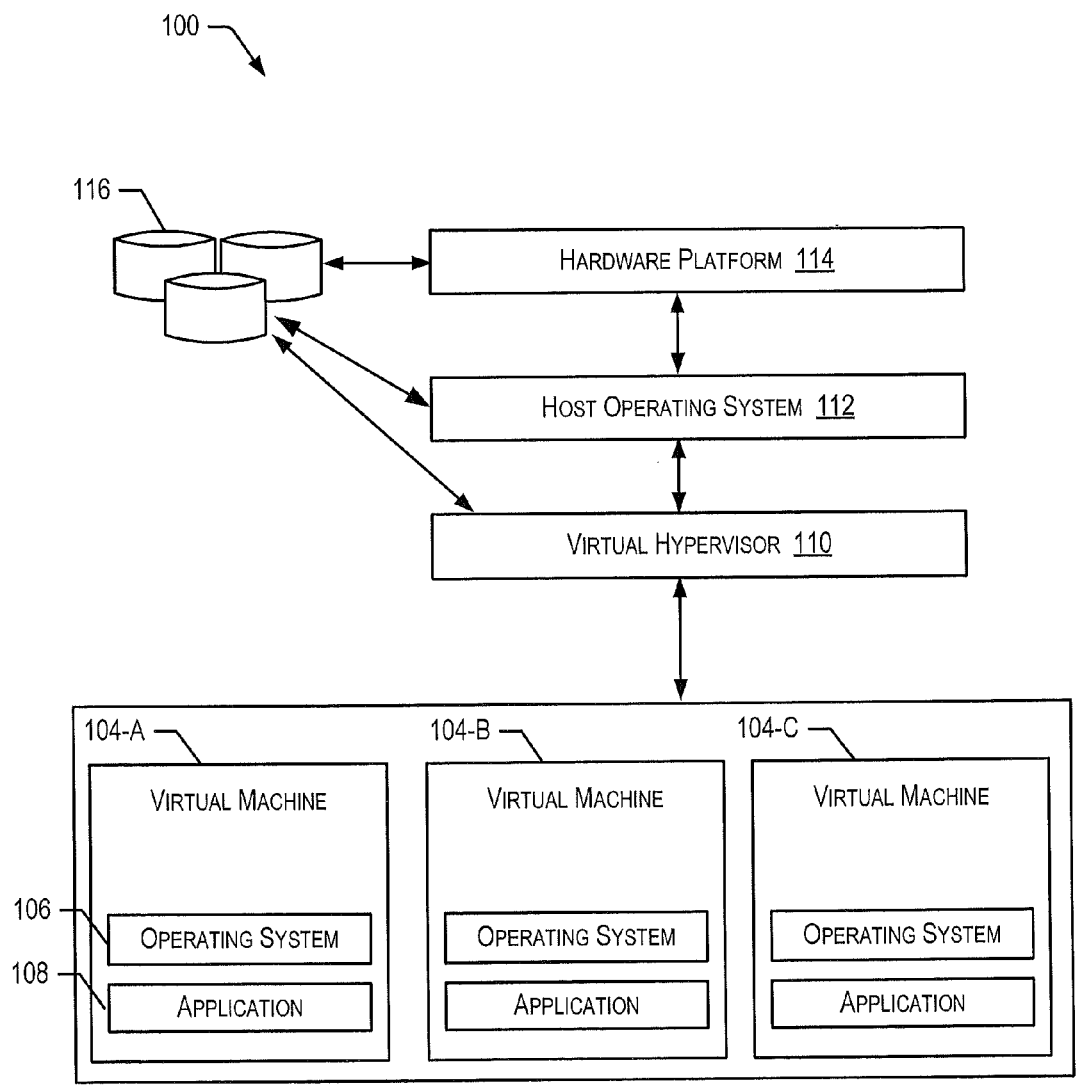
FIG. 1 is a block diagram of a computing system that supports a virtual operating environment.

In an example, a user may log into a VM on premises or in a cloud computing system. FIG. 1 illustrates server system 100 for a virtualized computing environment in which embodiments of the subject matter of the present disclosure can function. The server system 100 generally hosts one or more virtual machines 104A-104C (hereafter virtual machines 104), each of which runs a guest operating system 106 and application 108. The computing needs of users drive the functionality of the virtual machines 104. A virtual hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), handheld computer, mobile computing platform, server, or any other appropriate computer hardware. The hardware platform 114 may include computing resources such as a central processing unit (CPU); networking controllers; communication controllers; a display unit; a program and data storage device; memory controllers; input devices (such as a keyboard, a mouse, touch screen, etc.) and output devices such as printers. The CPU may be any conventional processor, such as the AMD Athlon™ 64, or Intel® Core™ Duo processor sets.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM), removable media, or any other suitable memory component. According to the illustrated embodiment, the host operating system 112 stands between the hardware platform 114 and the users and is responsible for the management and coordination of activities and the sharing of the computing resources.

Besides acting as a host for computing applications that run on the hardware platform 114, the host operating system 112 may operate at the highest priority level in the server 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 creates an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the virtual machine 104 and the hardware platform 114 through the host operating system 112. The virtual hypervisor 110 virtualizes the computing system resources and facilitates the operation of the virtual machines 104. The hypervisor 110 may provide the illusion of operating at the highest priority level to the guest operating system 106. In fact, the virtual hypervisor 110 merely maps the guest operating system's priority level to a priority level lower than the top most priority level. As a result, the virtual hypervisor 110 can intercept the guest operating system 106, executing instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 are also performed by the virtual hypervisor 110.

Virtual machines 104 present a virtualized environment to guest operating systems 106, which in turn provide an operating environment for applications 108 and other software constructs.

Each virtual machine 104 may be controlled by an agent and have a network interface. The network interface manages communications with other virtual machines 104. The virtual machines 104 are communicatively coupled via a network. The network facilitates wireless or wireline communication, and may communicate using, for example, IP packets, Frame Relay frames, Asynchronous Transfer Mode (ATM) cells, voice, video, data, and other suitable information between network addresses. The network may include one or more local area networks (LANs), radio access networks (RANs), metropolitan area networks (MANS), wide area networks (WANs), all or a portion of the global computer network known as the Internet, and/or any other communication system or systems at one or more locations.

Figure 2:
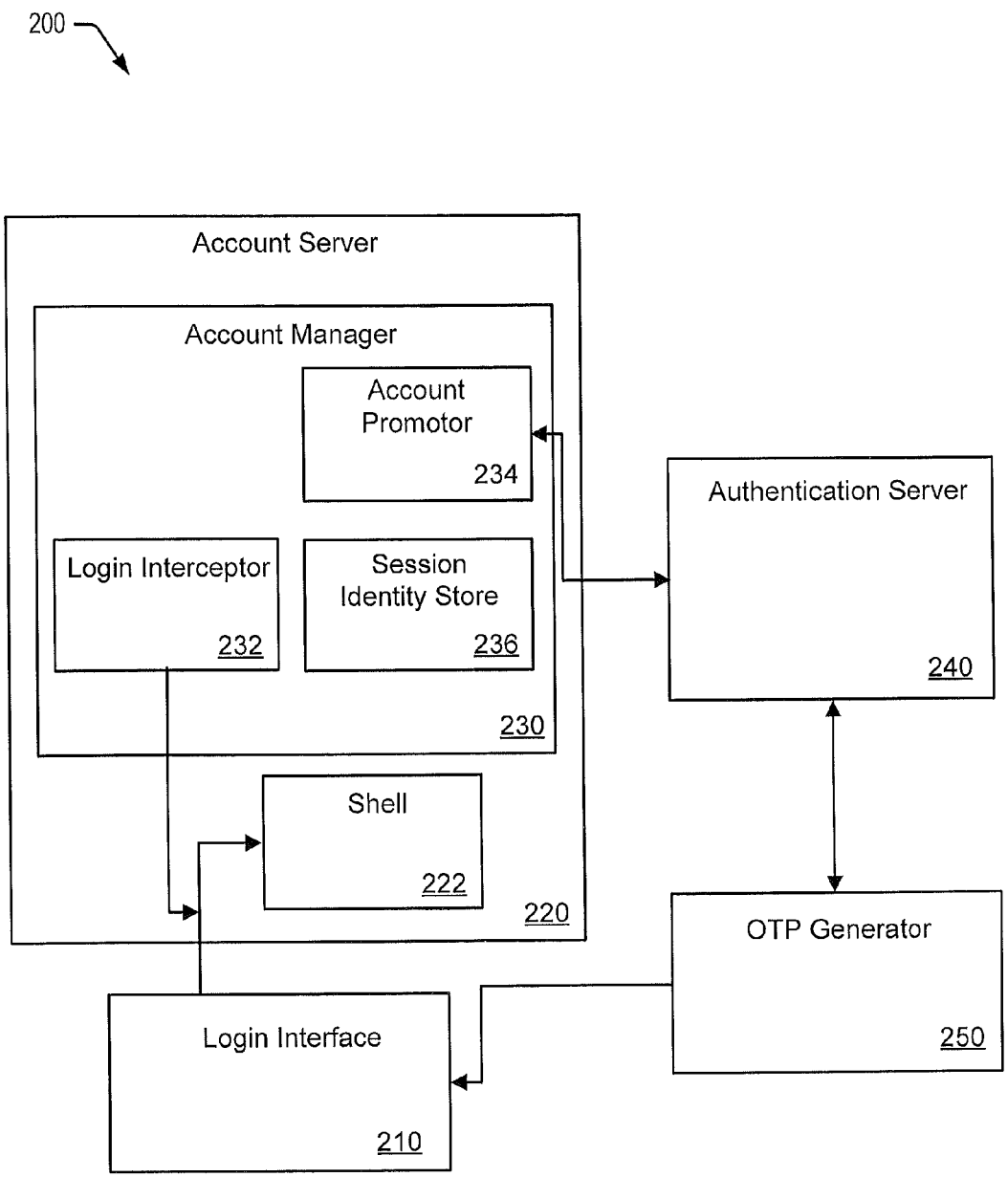
FIG. 2 illustrates a system for a shared account login with promotion to a higher authentication account, according to various embodiments.
Figure 3:
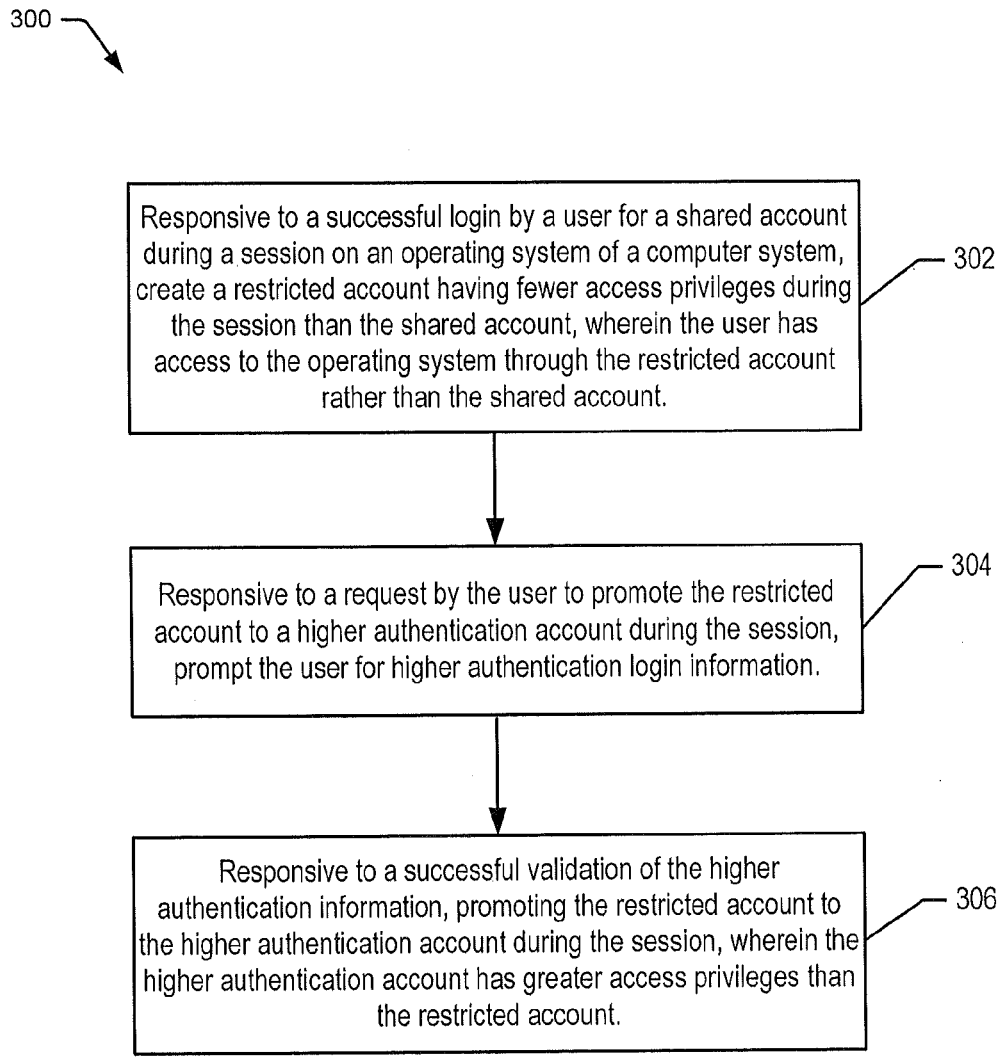
FIG. 3 illustrates a flowchart of a process for a shared account login with restriction and promotion to a higher authentication account, according to various embodiments.

FIG. 2 shows a system 200 for logging into a shared account, according to some embodiments. The login may be intercepted and the shared account may be changed to a restricted account that has reduced access privileges compared to the shared account. The restricted account may then be promoted to a higher authentication account having expanded access privileges. FIG. 3 shows a process 300 for restricting and promoting a user account and will be discussed in coordination with system 200.

A user may attempt to log into a server through a shared account, such as a root user account, through login interface 210. The shared account may have administrative privileges, including read, write, modify and execute. The shared account may be made available to other users and may not identify a specific user. For example, each user may be identified as a root user or an administrator rather than a specific user or an assigned corporate or organizational account. In some cases, a requested VM may provide a single login account, which may be the shared account. The shared account may be a standard account to be used for multiple VMs in a cloud computing environment. Separate accounts for local users need not be created, since those local users can initially be provided access to the shared account.

Login information, such as the root or administrative username and password, may be used to log into the shared account. However, the use of the shared account, such as through shell 222, may be intercepted by login interceptor 232 of account manager 230. In some cases, login interceptor 232 may intercept the login information prior to logging into the shared account. Interception may be performed at the native operating system level like a pluggable authentication module (PAM) stack.

When account manager 230 successfully validates the login information, account manager 230 may create a restricted user account, as illustrated by block 302. The restricted user account may be a virtual account managed by account manager 230. The restricted account may have fewer access privileges than the shared account. For example, the shared account may have read, write, modify and execute file access privileges, but the restricted account may include file access privileges of read and execute, but not write and modify. In some cases, privilege to write to select files or all files may be granted, but not privilege to modify such files, or vice versa. In some cases, only privilege to read is granted. The restrictions may be more operation and location specific. Alternatively or additionally, the privilege level that is granted may constrain the type of files that are accessible, and/or other computer resources that can be accessed (e.g., computer hardware such as network interfaces, peripherals, online or email accounts, disk interfaces, drives, directories, interaction with other users, etc.). Certain actions or locations may be more restricted than others. In some cases, fewer privileges may include a lower number of privileges. In other cases, fewer privileges may include a lower level of authorization or access to fewer resources.

Although the user may expect to log into the shared account using the login information, the user may instead be constrained to operate in the restricted mode with the restricted account. The account manager 230 may associate the restricted account with the session. According to some embodiments, the account manager 230 may maintain an identity store 236 for the session. The session's identity in the identity store 236 may be changed from the identity of the shared account to the identity of the restricted account, as shown by block 402 of process 400 in FIG. 4. The account manager 230 may also use native operating system interception to control access to certain resources such as sensitive files.

For example, on the native operating system (OS) level, the user identity may not change and the native OS may maintain the same user id. If a user attempts to login to the shared account, such as login on the native OS level as root (uid=0), the user on the native OS is always logged in as the root and the user does not detect any change. However, for the access manager 230, the following actions happen. First, during login, the login interceptor 232 figures out that it should restrict the user, so instead of root (as in this example), the user identity is changed to restricted root. Since the access manager 230 can intercept actions on the native OS level, the access manager 230 may check any security action like executing programs, opening files, changing identity, etc. Inside the policy of the access manager 230, restricted users can only read, execute or change a directory (unless granted more permissions) in this example so all other actions the user attempts at this point will be blocked by the access manager 230 (even though the native OS would have allowed them if such a request had reached the portion of the kernel that will implement the action. However, the access manager 230 catches those commands as soon as they enter the kernel and before it readies the kernel functions that will implement the action. Therefore, at this point the user is restricted (by the access manager 230, not the native OS), but the user can still perform basic operations like reading files or executing programs, Many operations by a user or application initiated by the user may require only the read and execute, while protecting the system from unauthorized modification or writing of data. User tracking and local user accounts would not be necessary for such operations. If more operations are desired or necessary for specific, perhaps less frequent occurrences, the user may request that the restricted account be promoted to have increased access privileges. In some cases, the user may attempt to modify a file in restricted mode and the attempted modification will fail. The user may be prompted for login information to promote the account or may request the promotion. For example, the user may run a promotion utility.

Upon certain actions or a request for promotion, account promoter 234 may prompt the user for higher authentication information, as shown in block 304. This login information may include a higher authentication username, such as a corporate username. The user may also be prompted for a higher authentication password, such as a corporate password. Account manager 230 may communicate with an authentication server 240 to verify the higher authentication information. In some cases, the higher authentication password may be a one-time user password obtained from authentication server 240 and/or one-time-password (OTP) generator 250. Obtaining the one-time-password may involve use of a simple mobile application or other method for verifying an identity. Also, other forms of two-factor authentication may be used (e.g., text message, token key, etc.).

The account manager 230 may receive a communication from authentication server 240, that the higher authentication information has been validated. The account manager 230 may then promote the restricted account to the higher authentication account, as shown in block 306.

Figure 4:
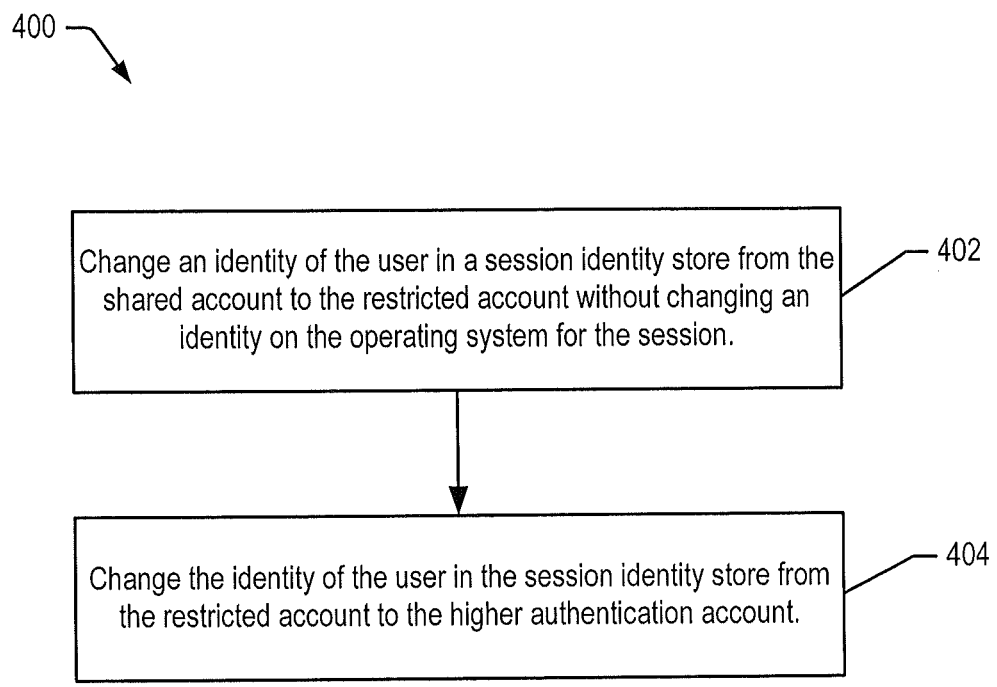
FIG. 4 illustrates a flowchart of a further process for a shared account login with restriction and promotion to a higher authentication account, according to various embodiments.

This may involve changing an identity of the session or identity of the user in the session from the restricted account to the higher authentication account, as shown further in block 404 of FIG. 4. This change may take place in the data store, policy and operation of the access manager 230 without any change to the identity or policy of the user or session on the native OS. The user may now have greater access privileges than the restricted account. This may include a greater number of privileges or types of privileges. Greater privileges may also include a higher level of authorization, access to more resources, or some other increase in privileges. For example, the higher authentication account may have read, write, modify and execute privileges where the restricted account had only read and execute privileges. The user may also have less restrictions or more access to other specific operations, programs, files, directories or storage locations, as necessary. In some embodiments, the higher authentication account has different (higher or lower) privileges than the shared account.

According to some embodiments, when account promoter 234 elevates the permissions or privileges of the restricted account, the session account is elevated to the higher authentication account within account manager 230. It may not be that the restricted account is elevated to the shared account or an administrative account. Rather, the account in the session is promoted to a different account, a higher authentication account, such as a corporate user account. The elevation applies to all commands in the session, or however the session is configured. It is not necessary to elevate the account at the time of each individual action or command, just once for the session. In various embodiments, the restriction and promotion occurs in the same session. This may differ from previous systems where individual actions required an authentication for each action. The corporate account can then be tracked, audited, blocked or customized.

Advantages of the embodiments described herein may be attractive to a cloud computing system rather than a computer system just on the premise. For example, if a user logs into a cloud computing system, the user may get a root user that administers for the whole cloud system. The user logs into a cloud image using the regular credentials he or she received from the cloud provider.

When the user would like to modify data in the system, or access a sensitive file, the system will require a stronger identification. This may be achieved by the system prompting the user for its corporate user name and a onetime password. After successful identification of the user, the user may be removed from the "restricted" mode and may be allowed to modify system files or perform other actions based on security policies enforced by the account manager 230. Every action of the user may be tracked, controlled and associated with the user's higher authentication account or corporate account. Permissions are granted based on security policies that are associated with the corporate account, not the shared account.

Embodiments described herein may be used to solve the problem of security enforcement and accountability for accessing VMs by shared accounts in the cloud computing environment. Unlike traditional systems, the embodiments provide for the ease of use and the security of user accounts without changing the regular login process as the regular login process may be fast and efficient. Efficiencies may derive from the ability of a user to log into the shared account with the shared account password, without the need to retrieve the password from a password vault system. As a result, the administrator does not need to work on frequent password changes, which may suffer from synchronization issues.

Only when the user is required to perform certain actions or changes in the VM, such as modifying a file, does the user need to change its regular work flow by authentication with a higher authentication account, such as with a corporate username and password.

When the user access is promoted to the higher authentication account, account manager 230 may provide tracking and control of activity of accounts on a cloud image based on the higher authentication account rather than the shared account, the restricted account or the use of any other local account. The speed and efficiency of the login is increased when no modification action is needed on the system, and strong authentication with the corporate account is performed only when modification actions on the system are needed. The user may operate in the strong authentication or corporate account until logging out.

According to some embodiments, account manager 230 partly run on a kernel of account server 220 and maintain information about an account session, send audit information, maintain a database of account and session information and provide a number of utilities for various actions. In some embodiments, account manager 230 may be or may utilize identity management technologies such as CA Control-Minder™ technology by Computer Associates, Inc. of Islandia, N.Y. Account manager 230 may control kernel interception and the session. Login interceptor 232 may intercept security related calls and manage session parameters and identities in the session identity store 236. Account manager 230 may control login interceptor 232 to change an identity of the session.

Login interceptor 232 may detect a login of the protected shared account and change the account identity inside a security agent of account manager 230 to a temporary restricted user name (restricted_<user>) and mark it as restricted. The security agent may only allow the user to perform read, execute and change directory operations. There may be a policy for the restricted account that is simpler than the full shared account. This policy may have fewer rules than the shared account but the rules and simple login provide for a more immediate value. In other embodiments, shell 222 may become a restricted shell.

This allows the user basic activities like viewing log files, but does not allow the user to change data elements like the native operating system setup. The user may be notified that he or she is working in a restricted mode and may be notified of how to remove the restriction when necessary. Otherwise, the user may not detect a difference in the login. This may include identification of a promotion utility. If the user needs to change files on the system, the user may need to perform a higher authentication (using a one-time-password) and then move out of restricted mode. During the higher authentication login process, the user may provide his corporate account with the one-time-password. This may involve entry of a user name and some type of pin or password into a separate security application. Other forms of multi-factor authentication may be used.

Once the user's higher authentication information is successfully authenticated, the account identity or handle inside the security agent is changed to the higher authentication account, such as the user's corporate account (that may not need to exist on the native operating system). This may mean that the restricted shell is removed or the restriction on shell 222 is removed. Shell 222 may become a higher privileged shell. The user is tracked and policies are enforced with the corporate account (<corp_user>). In some embodiments, this may mean auditing and enforcement of shared accounts based on the corporate user that is using them.

When a different user gets into the system with the shared credentials, before he or she can perform any change to the system, this new user may need to do strong authentication with his or her own corporate account. Once the login is approved, the security agent uses the corporate account rather than the shared account to track and control further activities on the system. Therefore, there is increased accountability without the need to define local users on the system or navigate through the shared account management system to check out a new password for the user. There may be no need to worry about managing passwords for the local users, maintaining them or removing them if the specific users no longer need access to the system. Also, if the user needs only to read or execute on the operating system, the user does not need to do strong authentication and can login the same way as before.

Once the restricted account is promoted, account promoter 234 communicates with authentication server 240 and informs login interceptor 232 or account manager 230 that the session runs under a new identity. The user may be notified that he or she is working in a stronger or higher authentication mode. In some embodiments, authentication server 240 may be or may utilize authentication technologies such as CA AuthMinder™ technology also by Computer Associates, Inc. The authentication server 240 may need to be defined in a strong authorization token of the strong authorization section of account manager 230.

The restriction, promotion and tracking may take place virtually within account manager 230 while the native operating system maintains the active shared account, such as the root or administrative account. The shared account may not be logged out of until the session ends for the higher authentication account.

Accordingly, there may not be a need to create local user accounts. A user may login through a regular login method and not have to change a preferred login mechanism, such as logging in through XWindows, secure shell (SSH) or any other shell. The user may not need to log into a specific server. Often a user desires to just read or execute some utilities and does not need to go through extra authentication. This presents a fast and efficient way without login procedure modifications. If more sensitive operations are to be performed, perhaps on a less frequent basis, the user may promote the account to a higher authentication account, such as a corporate account.

Some advantages of the embodiments may be more apparent for cloud computing systems than for on-premise login systems. When a system is on-premise, it may be easier to manage accounts all on the premise. It may also be easier to attach them to the system. However, in a cloud computing system, when a user is provided some image on the cloud, it may be harder to connect the image to a user store. Also, once a user gets an image of root key, the system may not know the identity of the actual root user (and may likely not care). The embodiments described herein provide for a light, low overhead, easier to maintain solution. A user may not need to get an image and then connect to all manner of image stores and management systems.

In an embodiment, system 200 may operate through a browser on a node or computing device. The browser may be any commonly used browser, including any multithreading browser.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a "circuit," "module," "component," or "system."

As will be appreciated by one skilled in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 5:
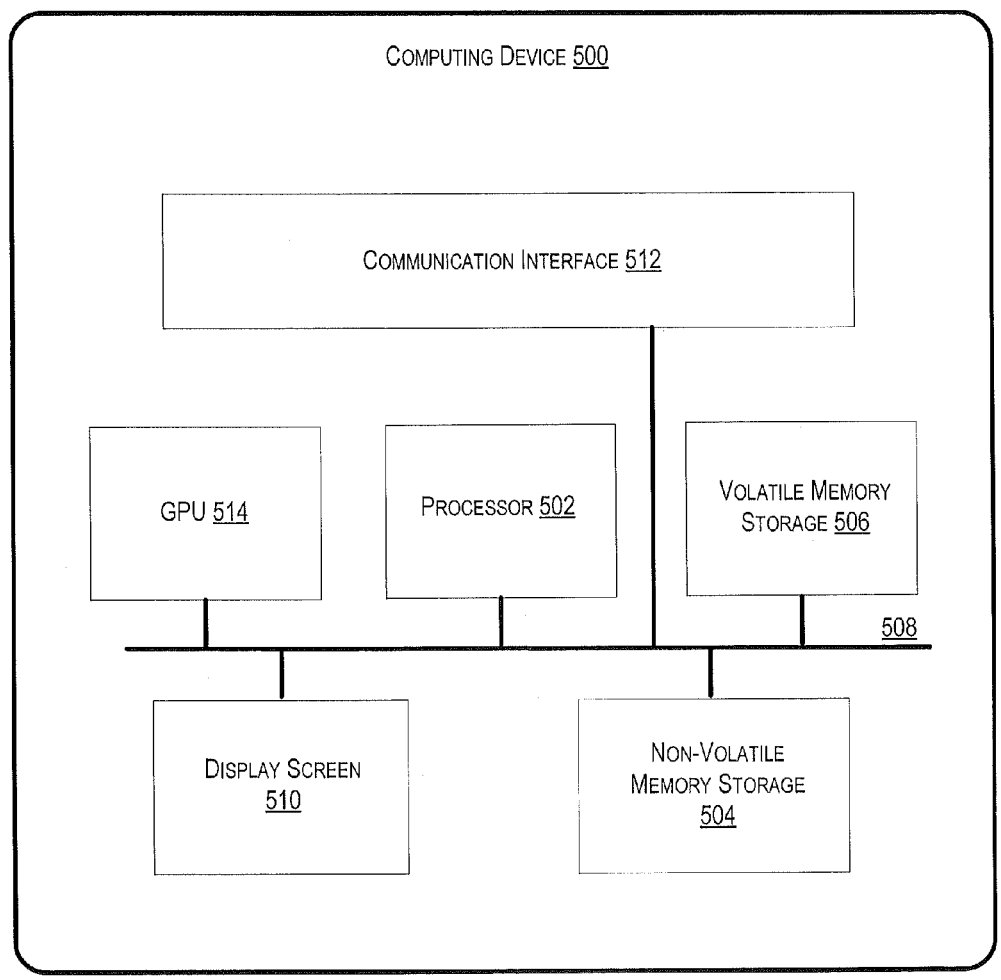
FIG. 5 is a block diagram of a computing device in which various embodiments can be implemented.

FIG. 5 is an example computer device 500 in which embodiments of the present disclosure, or portions thereof, may be implemented as computer-readable code. For example, the components of systems 100 and 200 or any other components of methods 300 and 400 may be implemented in one or more computer devices 500 using hardware, software implemented with hardware, firmware, tangible computer-readable storage media having instructions stored thereon, or a combination thereof and may be implemented in one or more computer systems or other processing systems. Computer devices 500 may also be virtualized instances of computers. Components and methods in FIGS. 1-4 may be embodied in any combination of hardware and software.

Computing device 500 may include one or more processors 502, one or more non-volatile storage mediums 504, one or more memory devices 506, a communication infrastructure 508, a display screen 510 and a communication interface 512. Computing device 500 may also have networking or communication controllers, input devices (keyboard, a mouse, touch screen, etc.) and output devices (printer or display).

Processor(s) 502 are configured to execute computer program code from memory devices 504 or 506 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 514 is a specialized processor that executes instructions and programs, selected for complex graphics and mathematical operations, in parallel.

Non-volatile memory storage 504 may include one or more of a hard disk drive, flash memory, and like devices that may store computer program instructions and data on computer-readable media. One or more of non-volatile storage memory 504 may be a removable storage device.

Volatile memory storage 506 may include one or more volatile memory devices such as but not limited to, random access memory. Communication infrastructure 508 may include one or more device interconnection buses such as Ethernet, Peripheral Component Interconnect (PCI), and the like.

Typically, computer instructions are executed using one or more processors 502 and can be stored in non-volatile memory storage 504 or volatile memory storage 506.

Display screen 510 allows results of the computer operations to be displayed to a user or an application developer.

Communication interface 512 allows software and data to be transferred between computer system 500 and external devices. Communication interface 512 may include a modem, a network interface (such as an Ethernet card), a communications port, a PCMCIA slot and card, or the like. Software and data transferred via communication interface 512 may be in the form of signals, which may be electronic, electromagnetic, optical, or other signals capable of being received by communication interface 512. These signals may be provided to communication interface 512 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Embodiments of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described embodiments or any actual software code with the specialized control of hardware to implement such embodiments, but should be defined only in accordance with the following claims and their equivalents.

What is claimed is:

1. A method, comprising:
responsive to a successful login by a user for a shared account on an operating system of a computer system during a session on the operating system of the computer system, performing operations comprising:
intercepting the successful login by the user for the shared account prior to control of the session on the operating system corresponding to the successful login for the shared account being returned to the user;
creating, by the computer system during the interception of the successful login by the user for the shared account, a restricted account having fewer access privileges to resources of the computer system during the session on the operating system than the shared account,
wherein the restricted account is a virtual account on the operating system for the user different from an identity of the user on the operating system for the session on the operating system, and
wherein creating the restricted account comprises changing an identity of the user in a session identity store on the operating system from the shared account to the restricted account without changing the identity of the user on the operating system for the session on the operating system;
returning control of the session on the operating system corresponding to the successful login for the shared account to the user; and
restricting access of the user during the session on the operating system to the fewer access privileges of the restricted account to the resources of the computer system;
responsive to a request by the user to promote the restricted account to a higher authentication account during the session on the operating system, prompting the user for higher authentication information; and
responsive to a successful validation of the higher authentication information, promoting the restricted account to the higher authentication account during the session on the operating system, wherein the higher authentication account has greater access privileges to resources of the computer system than the restricted account.

2. The method of claim 1, wherein promoting the restricted account to the higher authentication account comprises:
changing the identity of the user in the session identity store from the restricted account to the higher authentication account.

3. The method of claim 1, wherein the shared account has administrative access privileges to resources of the computer system during the session on the operating system, comprising read, write, modify and execute file access privileges.

4. The method of claim 3, wherein the restricted account comprises read and execute file access privileges and not write and modify file access privileges during the session.

5. The method of claim 4, wherein the higher authentication account comprises read, execute, write and modify file access privileges.

6. The method of claim 1, wherein the higher authentication account has a different level of access privileges to resources of the computer system than the shared account.

7. The method of claim 1, further comprising:
tracking activity of the user through the higher authentication account.

8. A system, comprising:
a processor; and
a memory coupled to the processor and comprising computer readable program code embodied in the memory that when executed by the processor causes the processor to perform operations comprising:
responsive to a successful login by a user for a shared account on an operating system of a computer system during a session on the operating system of the computer system, performing operations comprising:
intercepting the successful login by the user for the shared account prior to control of the session on the operating system corresponding to the successful login for the shared account being returned to the user;
creating, during the interception of the successful login by the user for the shared account, a restricted account having fewer access privileges to resources of the computer system during the session on the operating system than the shared account,
wherein the restricted account is a virtual account on the operating system for the user different from an identity of the user on the operating system for the session on the operating system, and
wherein creating the restricted account comprises changing an identity of the user in a session identity store on the operating system from the shared account to the restricted account without changing the identity of the user on the operating system for the session on the operating system;
returning control of the session on the operating system corresponding to the successful login for the shared account to the user; and
restricting access of the user during the session on the operating system to the fewer access privileges of the restricted account to the resources of the computer system;
responsive to a request by the user to promote the restricted account to a higher authentication account during the session on the operating system, prompting the user for higher authentication information; and
responsive to a successful validation of the higher authentication information, promoting the restricted account to the higher authentication account during the session on the operating system, wherein the higher authentication account has greater access privileges to resources of the computer system than the restricted account.

9. The system of claim 8, wherein the operations further comprise:
changing the identity of the user in the session identity store from the restricted account to the higher authentication account.

10. The system of claim 8, wherein the shared account has administrative access privileges to resources of the computer system during the session on the operating system, comprising read, write, modify and execute file access privileges.

11. The system of claim 10, wherein the restricted account comprises read and execute file access privileges and not write and modify file access privileges during the session.

12. The system of claim 11, wherein the higher authentication account comprises read, execute, write and modify file access privileges.

13. The system of claim 8, wherein the higher authentication account has a different level of access privileges to resources of the computer system than the shared account.

14. A computer program product, comprising:
a non-transitory computer readable storage medium having computer readable program code embodied in the non-transitory computer readable storage medium that when executed by a processor causes the processor to perform operations comprising:
responsive to a successful login by a user for a shared account on an operating system of a computer system during a session on the operating system of the computer system, performing operations comprising:
intercepting the successful login by the user for the shared account prior to control of the session on the operating system corresponding to the successful login for the shared account being returned to the user;
creating, during the interception of the successful login by the user for the shared account, a restricted account having fewer access privileges to resources of the computer system during the session on the operating system than the shared account,
wherein the restricted account is a virtual account on the operating system for the user different from an identity of the user on the operating system for the session on the operating system, and
wherein creating the restricted account comprises changing an identity of the user in a session identity store on the operating system from the shared account to the restricted account without changing the identity of the user on the operating system for the session on the operating system;
returning control of the session on the operating system corresponding to the successful login for the shared account to the user; and
restricting access of the user during the session on the operating system to the fewer access privileges of the restricted account to the resources of the computer system;
responsive to a request by the user to promote the restricted account to a higher authentication account during the session on the operating system, prompting the user for higher authentication information; and
responsive to a successful validation of the higher authentication information, promoting the restricted account to the higher authentication account during the session on the operating system, wherein the higher authentication account has greater access privileges to resources of the computer system than the restricted account.

15. The computer program product of claim 14, further comprising computer readable program code causing the processor to perform:
changing the identity of the user in the session identity store from the restricted account to the higher authentication account.

16. The method of claim 1, wherein the higher authentication information comprises a higher authentication username that uniquely identifies the user and a higher authentication password is generated by a one-time password generator.

17. The system of claim 8, wherein the higher authentication information comprises a higher authentication username that uniquely identifies the user and a higher authentication password generated by a one-time password generator.

18. The computer program product of claim 14, wherein the higher authentication information comprises a higher authentication username that uniquely identifies the user and a higher authentication password generated by a one-time password generator.

19. The method of claim 1, wherein creating, by the computer system during the interception of the successful login by the user for the shared account, the restricted account is performed by an account manager on the operating system of the computer system, and
wherein restricting access of the user during the session on the operating system takes place virtually within the account manager while the operating system of the computer system maintains the shared account on the operating system.

20. The system of claim 8, wherein the creating, during the interception of the successful login by the user for the shared account, the restricted account is performed by an account manager on the operating system of the computer system, and
wherein restricting access of the user during the session on the operating system takes place virtually within the account manager while the operating system of the computer system maintains the shared account on the operating system.

21. The computer program product of claim 14, wherein the creating, during the interception of the successful login by the user for the shared account, the restricted account is performed by an account manager on the operating system of the computer system, and
wherein restricting access of the user during the session on the operating system takes place virtually within the account manager while the operating system of the computer system maintains the shared account on the operating system.

\* \* \* \* \*